(12) United States Patent
Heilig

(10) Patent No.: US 6,432,016 B1
(45) Date of Patent: Aug. 13, 2002

(54) DRIVING DEVICE

(75) Inventor: Eduard Heilig, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 09/673,585

(22) PCT Filed: May 3, 1999

(86) PCT No.: PCT/EP99/02982

§ 371 (c)(1), (2), (4) Date: Oct. 18, 2000

(87) PCT Pub. No.: WO99/58357

PCT Pub. Date: Nov. 18, 1999

(30) Foreign Application Priority Data

May 9, 1998 (DE) .......................... 198 20 903

(51) Int. Cl.[7] .............................. F16H 31/00
(52) U.S. Cl. ................. 475/140; 192/219.4; 192/219.6
(58) Field of Search ................ 475/141, 142, 475/119, 127, 140; 192/219.6, 219.4, 221

(56) References Cited

U.S. PATENT DOCUMENTS

| 3,635,317 A | * | 1/1972 | Crabb et al. ............... 137/596 |
| 3,724,609 A | | 4/1973 | Kobald ........................ 188/170 |
| 3,854,559 A | * | 12/1974 | Talak et al. ............... 192/103 F |
| 4,195,716 A | | 4/1980 | Wirt ............................ 192/3 R |
| 4,256,350 A | * | 3/1981 | Hoefer ........................ 188/170 |
| 4,576,418 A | * | 3/1986 | Holzinger et al. ............ 303/71 |
| 5,306,215 A | * | 4/1994 | Mann et al. ................ 475/141 |
| 5,779,586 A | | 7/1998 | Gebhard et al. ............ 475/140 |

FOREIGN PATENT DOCUMENTS

| DE | 20 63 862 | | 7/1971 |
| DE | 43 24 063 A1 | | 1/1995 |
| DE | 44 05 299 A1 | | 8/1995 |
| DE | 44 08 472 A1 | | 9/1995 |
| DE | 44 42 090 A1 | | 5/1996 |
| WO | WO 95/25021 | * | 9/1995 |

* cited by examiner

*Primary Examiner*—Rodney H. Bonck
*Assistant Examiner*—David D. Le
(74) *Attorney, Agent, or Firm*—Davis & Bujold, P.L.L.C.

(57) ABSTRACT

The driving device comprises a hydraulically shiftable friction coupling and a friction brake by means of which an input can be connected to a gear and which perform the function of a parking brake wherein an auxiliary release device comprising an adjustable accumulator piston and gear shift pistons interacting therewith separate friction coupling and friction brake thus interrupting the drive train; the accumulator cylinder of the auxiliary release device is connected to a supply tank via a connecting line and is provide with a blocking device which cuts off the connection to the supply tank when the auxiliary release device is actuated.

10 Claims, 1 Drawing Sheet

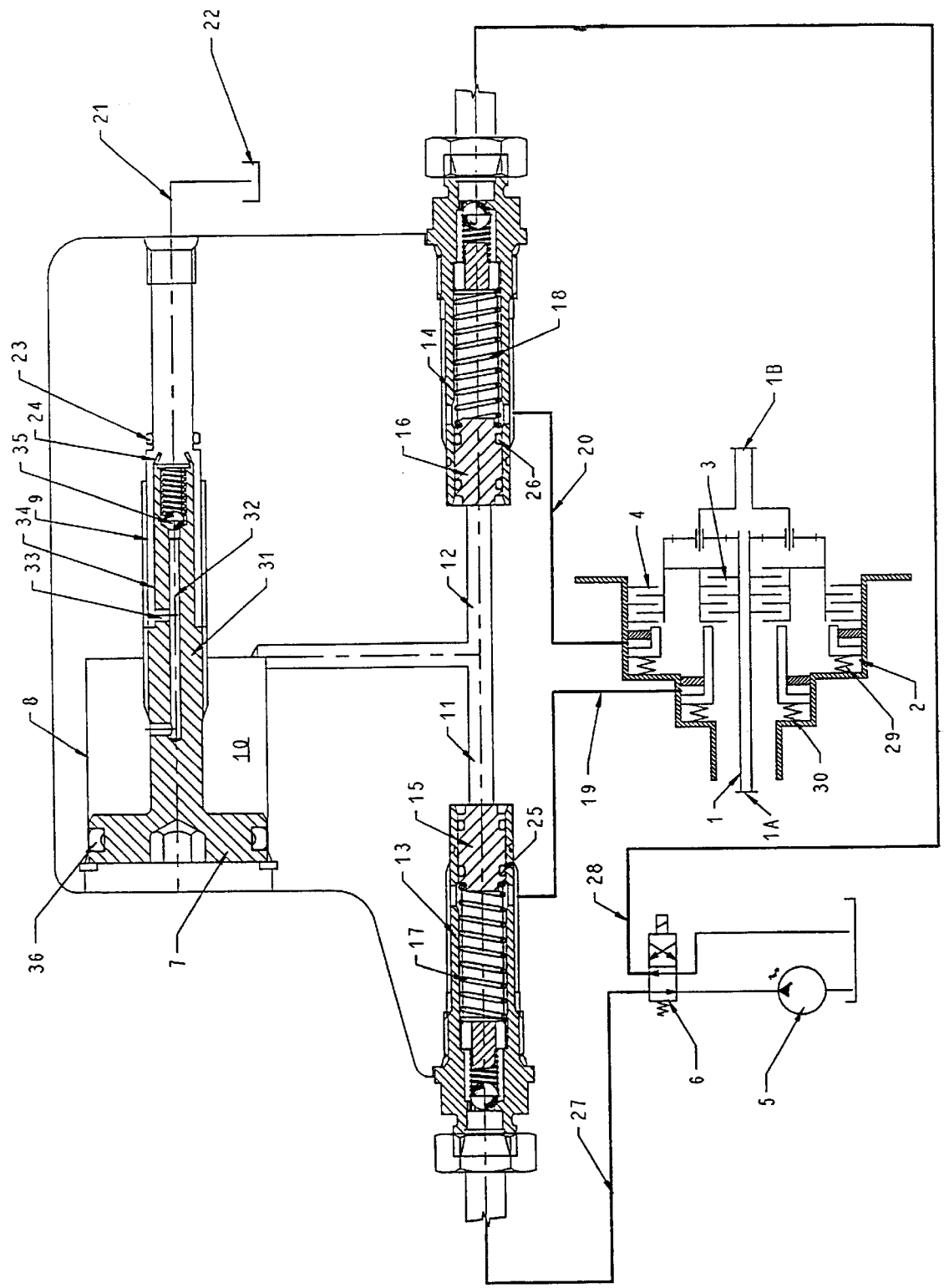

DRIVING DEVICE

FIELD OF THE INVENTION

This invention relates to a driving device, particularly for driving the wheels of a motor vehicle such as excavators and wheel loaders.

BACKGROUND OF THE INVENTION

In power shift transmissions, such as used in industrial vehicles, it is known to provide an auxiliary release device by which the drive train of the vehicle is interrupted thus making it possible to tow a vehicle that has broken down.

The Applicant's DE 44 08 472 describes a driving device which is provided with an input, a mechanical gear rear-mounted thereon and two hydraulically shiftable friction couplings and friction brakes through which the input can be connected with the gear and which perform the functions of a parking brake. Friction coupling and friction brake are connected via control-pressure lines with an auxiliary release device which has an adjustable accumulator piston and gear shift pistons interacting therewith so that when the accumulator piston is actuated, the gear shift pistons supply the contents of the accumulator piston via the control-pressure lines of the friction coupling and of the friction brake in the sense of a separation.

The device can have a compensation cylinder where is situated a compensation piston prestressed by a spring device and connected with the contents of the accumulator piston so that in the hydraulic system of the auxiliary release device an even pressure always prevails and pressure changes due to temperature oscillations are compensated without problem.

SUMMARY OF THE INVENTION

The problem on which this invention is based is further to simplify the construction of such a driving device with which a vehicle in broken down state can be towed without problem and thereby to reduce the cost of production.

BRIEF DESCRIPTION OF THE DRAWINGS

The invention is explained in detail below with reference to the drawing in which an advantageous embodiment is shown.

In the only FIGURE is diagrammatically shown in unactuated state the essential part of the driving device together with the auxiliary release device.

DESCRIPTION OF THE PREFERRED EMBODIMENTS

A driving train designated with 1 having an input 1A and an output 1B is separated in a manner known per se with a hydraulically actuated coupling device 2 which has a friction coupling 3 and a friction brake 4, wherein the latter does not perform the actual function of a brake but constitutes a coupling in which the outer discs are firmly situated within the coupling housing. In the friction coupling 3 both the inner and the outer discs can rotate.

For supply of the device with hydraulic oil, a pump 5 is provided wherein the coupling and uncoupling of the coupling device 2 is controlled by a magnetic valve 6.

The magnetic valve 6 is here shifted in a manner such that in case of failure of the pump 5 or generally in case of pressure drop within the hydraulic system, the coupling is automatically engaged so that it is not possible to tow the vehicle; to this end a separation of the drive train is necessary.

The drive train is separated by actuating an accumulator piston 7 in an accumulator cylinder 8. The accumulator piston 7 is actuated manually, e.g. with an appropriately profiled part upon the accumulator piston 7 in the form of a hexagon or inner hexagon upon which a suitable tool is fastened in order to move the accumulator piston 7 by hand.

In the embodiment shown, the accumulator piston 7, which is moved into the accumulator cylinder 8, has an accumulator piston projection 31 which is provided with an outer thread and which extends into a connecting line segment 9 which extends from accumulator cylinder 8 to a connecting line 21 which extends to an oil supply tank 22. The accumulator piston projection 31 of the accumulator piston 7 has a hole 32 extending in axial direction which, on one side, is connected with the contents 10 of the accumulator cylinder 8 and, on the other, via a duct 33, with a reduced cross section segment 34 of the accumulator piston projection 31 so that in the unactuated state shown in the single figure there is a fluid connection of the contents 10 of the accumulator cylinder 8 to the supply tank 22. The connecting line segment 9 is connected to the actual connecting line 21 via a narrow point 24, said narrow point 24 being dimensioned so that upon actuation of the auxiliary release device, i.e. when the accumulator piston 7 moves, its connecting line segment 9 sealingly traverses the narrow point 24 and interrupts the fluid connection between the contents 10 and the supply tank 22. With 35 is designated a spring-loaded recoil valve provided in the piston projection 31 of the accumulator piston 7 and serving as overpressure valve preventing an inadmissibly high pressure in the system when the auxiliary release device is actuated.

In a normal driving state, the contents 10 of the accumulator cylinder 8 is connected with the supply tank 22 so that the oil chamber can be completely filled after actuation of the auxiliary release device; during actuation of the auxiliary release device the connection between supply tank 22 and contents 10 is cut off.

When the accumulator piston 7 moves, the oil located in the contents 10 is, in a conventional manner, fed via the auxiliary device control lines 11, 12 to the two gear shift valves 13, 14 so that the gear shift pistons 15, 16 placed therein are actuated and moved against the force of a spring device 17, 18 to the extent that the openings of the brake and clutch actuating lines 19, 20 branching off from the gear shift valves 13, 14 become released.

A direct hydraulic connection thus exists via the brake and clutch actuating lines 19, 20 between the contents 10 of the accumulator cylinder 8 and the coupling device 2 so that, e.g. the friction coupling 3 can be disengaged by the gear shift element 13 and the friction brake 4 by the gear shift valve 14. The disengagement results against the resistance of pressure springs 29, 30 in the coupling device 2.

In order that as result of too great a reduction of the contents 10 of the accumulator cylinder 8, i.e. of too large an amount of oil being removed for the contents 10, there will not generate within the hydraulic circuit a pressure too elevated, the overpressure valve 35 is provided at the end of the hole 32 in the projection 31 of the accumulator piston 7. Thereby care is also taken that during oscillations of the oil temperature the amount of oil located in the close circuit be constant so that no erroneous actuation of the gear shift pistons 15, 16 can occur.

Seals 25, 26 provided in the gear shift valves 13, 14 prevent that oil from the closed circuit from penetrating the gear shift control-pressure lines 27, 28. The seal 36 prevents oil from escaping from the contents of the cylinder 10.

If the normal driving operation should be resumed, the separation of the drive train 1 has to be canceled again. To this end, the accumulator piston 7 is manually moved to its initial position, e.g. by contrary rotation of the inner hexagon whereby the projection 9 can be guided into a thread. Thereby the contents 10 in the accumulator cylinder 8 again increase due to the receding oil whereby the friction coupling 3 and the friction brake 4 are again engaged. The prestressed pressure springs 29, 30 in the coupling device 2, which always produce an automatic engagement of the coupling device 2, in case the oil pressure within the closed hydraulic circuit should drop, produce the engagement.

The prestressed pressure springs 17, 18 in the gear shift valves 13, 14 now move the gear shift pistons 15, 16 likewise again to their initial position so that the oil contents existing in the gear shift valves 13, 14 again flow into the accumulator cylinder 8.

Since, as already said, upon an actuator of the auxiliary release device both the friction coupling 3 and the friction brake 4 are disengaged, even in case of an unintended actuation of the input no power is transmitted so that the vehicle cannot be unintentionally moved.

Reference numerals 1 drive train
2 coupling device
3 friction coupling
4 friction brake
5 pump
6 magnetic valve
7 accumulator piston
8 accumulator cylinder
9 connecting line segment
10 contents of the cylinder
11 auxiliary device control line
12 auxiliary device control line
13 gear shift valve
14 gear shift valve
15 gear shift piston
16 gear shift piston
17 pressure spring
18 pressure spring
19 brake actuating line
20 clutch actuating line
21 connecting line
22 supply tank
23 seal
24 narrow point
25 seal
26 seal
27 gear shift control-pressure line
28 gear shift control-pressure line
29 pressure spring
30 pressure spring
31 accumulator piston projection
32 hole
33 duct
34 reduced cross section segment
35 overpressure valve
36 seal

What is claimed is:

1. A driving device, for driving the wheels of a motor vehicle, an input, an output and two shiftable friction couplings (3, 4) wherein:

said friction couplings (3, 4) are closed by spring tension to connect the input to the output and opened by hydraulic pressure supplied to said friction couplings (3, 4) via gear shift valves (13, 14) and appertaining brake and clutch control-pressure lines (19, 20) to disconnect the output from the input;

both friction couplings (3, 4) are closed by said spring tension when the pressure drops in the hydraulic system and perform the function of a parking brake, gear shift pistons (15, 16) of said gear shift valves (13, 14) interactingly connected via auxiliary device control lines (11, 12) with an auxiliary release device which has an adjustable accumulator piston (7) and an accumulator cylinder (8) and which, in an unactuated state, contains a pressureless oil content; and upon actuation of said accumulator piston (7), oil contents accumulated in said accumulator cylinder (8) displaces said gear shift pistons (15, 16) in order to connect said auxiliary device control lines (11, 12) with said brake and clutch control-pressure lines (19, 20) so that the oil contents accumulated in said auxiliary release device opens said friction couplings;

said accumulator cylinder (8) is connected via a connecting line (21) with a supply tank (22), and said accumulator piston (7) of said auxiliary release device including an accumulator piston projection (31) extending into a connecting line segment (9) of said connecting line (21), and said connecting line (21) includes a narrow point 24 between said connecting line segment (9) and said connecting line (21) and on the transition of said accumulator piston projection (31) to said connecting line (21) which upon actuation of said accumulator piston (7) is traversed in tight manner by a reduced cross section segment (34) of said accumulator piston projection (9) of said accumulator piston (7) to interrupt the connection to said supply tank (22) upon actuation of said accumulator piston (7) of said auxiliary device.

2. The driving device according to claim 1, wherein said accumulator piston projection (31) of said accumulator piston (7) is traversed by an axial hole (32) which is connected on one side with the contents (10) of said accumulator cylinder (8) and on the other, via a duct (33), with the outer wall of said reduced cross section segment (34) of said accumulator piston projection (31) so that in unactuated state of said auxiliary release device a fluid connection exists between contents (10) and supply tank (22).

3. The driving device according to claim 1, wherein an end of said hole (32) facing said narrow point (24) is provided in said accumulator piston projection (31) with a spring-loaded overpressure valve (35).

4. The driving device according to claim 1, wherein said accumulator piston (7) is manually actuatable.

5. The driving device according to claim 4, wherein said accumulator piston (7) is axially movable via a thread placed on said accumulator piston projection (31).

6. The driving device according to claim 5, wherein said accumulator piston (7) is provided with a hexagonal head or with an inner hexagon.

7. The driving device according to claim 1, wherein said gear shift pistons (15, 16) are provided with spring devices (17, 18) which press said gear shift pistons back to initial or basic position.

8. The driving device according to claim 1, wherein said auxiliary release device is integrated in the gear block of the motor vehicle.

9. The driving device according to claim 1, wherein the oil contents of said auxiliary release devices are separated by seals (25, 26) from said gear shift control-pressure lines (27, 28) of said gear shift pistons (15, 16).

10. The driving device according to claim 9, wherein said seals (25, 26) are provided upon said gear shift pistons (15, 16).

* * * * *